Dec. 16, 1969     H. J. SCHELLSTEDE ET AL     3,484,122
DRILL PIPE PROTECTOR AND METHOD OF CONSTRUCTING THE SAME
Filed Jan. 12, 1968
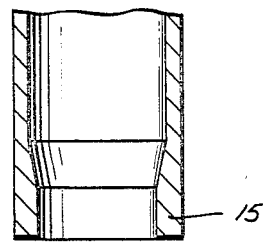
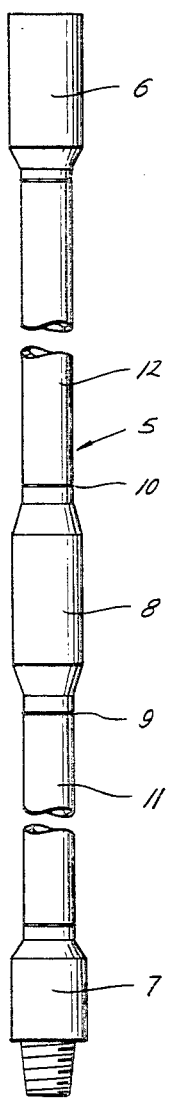
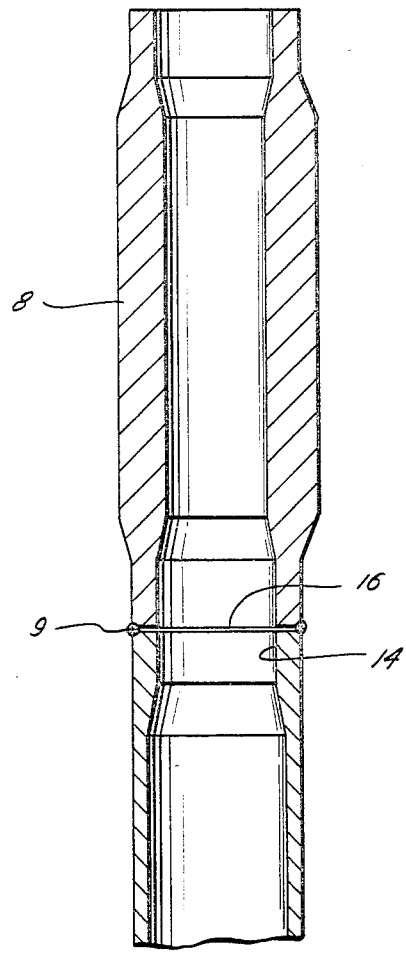
Herman J. Schellstede
Thomas M. Sanders
INVENTORS
BY
ATTORNEY

United States Patent Office 3,484,122
Patented Dec. 16, 1969

3,484,122
DRILL PIPE PROTECTOR AND METHOD OF
CONSTRUCTING THE SAME
Herman J. Schellstede, Houma, and Thomas M. Sanders,
New Iberia, La., assignors, by mesne assignments, to
Herman J. Schellstede, New Iberia, La.
Filed Jan. 12, 1968, Ser. No. 697,443
Int. Cl. F16l 13/02
U.S. Cl. 285—286                                    1 Claim

ABSTRACT OF THE DISCLOSURE

Two separate sections of drill pipe are aligned end to end and a relatively short sleeve of greater outside diameter than the pipe sections is interposed between the same and butt welded to the adjacent pipe ends to form a unitary length of drill pipe having an integral protector formed intermediately thereon.

CROSS-REFERENCE TO RELATED APPLICATIONS

In a copending application of the present inventors, Ser. No. 645,738 filed June 13, 1967, there is described and claimed a unitary section of drill pipe having an efficient, integral protector collar theron. The protector collar is formed by means of endwise abutting external enlargements on individual drill pipe sections which are butt welded together. However, such externally enlarged pipe extremities frequently are not provided on drill pipe, prior to the application thereto of the tool joints, and therefore these terminal enlargements are special, which adds to the expense and complication thereof. Moreover, even though such terminal enlargements are initially provided as mountings for the tool joints, their use for the purpose described in the mentioned application may not provide a protector of the desired dimensions.

BACKGROUND OF THE INVENTION

This invention relates to drill pipe as used, for instance, in the drilling of water and oil wells, and consists particularly in novel means and method of providing such pipe with integral drill pipe protectors.

SUMMARY OF THE INVENTION

Accordingly, an object of the present invention is to provide a length of drill pipe having such a protector collar formed integrally thereon so as to effectively prevent dislodgment thereof, without the necessity of providing on the pipe ends which are brought together special externally enlarged elements.

Another object is to provide an integral protector on a unity section of drill pipe, utilizing more-or-less conventional drill pipe sections prior to the application thereto of the tool joints.

In accordance with the present invention, a pair of lengths of more-or-less conventional drill pipe are arranged end to end. The pipe sections have internally thickened extremities upon which the tool joints are supposed to be welded. There is interposed between the adjacent ends of the pipe sections a relatively short sleeve which is of the desired length and outside diameter of an effective drill pipe protector collar. This sleeve is then butt welded to the adjacent ends of the drill pipe sections by any suitable welding procedure—for instance, electron beam welding which does not leave internal and external welding projections.

BRIEF DESCRIPTION OF THE DRAWING

In the accompanying drawing,

FIG. 1 is an elevation of a section of drill pipe having the novel drill pipe protector applied thereto.

FIG. 2 is a partially exploded longitudinal section illustrating the novel pipe and protector parts.

DESCRIPTION OF PREFERRED EMBODIMENT

FIG. 1 shows a unitary length of drill pipe, generally designated 5, having a "box" tool joint 6 secured to one end thereof and a "pin" tool joint 7 secured to the other end thereof in more-or-less conventional fashion. Intermediately of the drill pipe length 5 there is provided an integral drill pipe protector or saver collar formed of a sleeve 8 butt welded at 9 and 10 to adjacent ends of initially separately-formed sections 11 and 12 of drill pipe. The drill pipe sections 11 and 12 are substantially identical and may be of standard form including internal terminal upsets at both ends, as at 14 and 15. At the outer ends of sections 11 and 12, tool joints 6 and 7 are secured, conveniently, to similar upsets.

Tool joints, however, are omitted from the inner ends of the pipe sections 11 and 12, and these pipe sections are lined up, as indicated in FIG. 2, with sufficient space therebetween for the interposition of the protector sleeve 8. This sleeve conveniently is made of the same inside diameter as internally thickened terminal portions 14 and 15 of the drill pipe sections, but the medial outside diameter of the sleeve is substantially greater than that of the drill pipe sections, both the sleeve outside diameter and its length being such as to constitute a protector collar of the desired dimensions. For instance, the medial outside diameter of sleeve 8 may approximate or exceed that of tool joints 6 and 7. At the ends of sleeve 8 are externally reduced terminal parts 16 and 17 which match upsets 14 and 15 at the pipe ends. Next, sections 11 and 12 and sleeve 8 are placed in a suitable welding jig and moved longitudinally closely together, as at 16a. Finally, the abutting pipe section and collar ends are butt welded prefreably by eletcron beam welding which does not require beveling of the abutting pipe ends and affects only a relatively narrow peripheral band of the welded pipes, as at 9 in FIG. 2, while providing adequate strength. Moreover, protrusion of the weld metal into the interior of the pipe is prevented. After the completion of the welding steps at both ends of collar 8, the welds are smoothed, if necessary, by machining steps and, thereafter, tool joints 6 and 7 may be applied, if this has not already been done.

Of course, drill pipe sections 11 and 12 may be of standard or of any other desired lengths, and, furthermore, more than one of the protector collars 8 may be interposed by the use of more than two initially individual and separate drill pipe sections. The resultant protector collars are as strong and rigid as the drill pipe itself, and therefore cannot be dislodged by blows or abrasions which would not adversely affect the pipe itself, and, moreover, the protector collar may be worn down to the outside diameter of the drill pipe without adversely affecting the strength or rigidity of the pipe string.

The invention may be modified in various respects as will occur to those skilled in the art.

We claim:
1. A unitary length of drill pipe comprising a pair of drill pipe sections disposed end to end in alignment and with thickened wall portions at both ends, tool joints secured to the outer thickened ends of said sections, and a relatively short one piece sleeve interposed between the adjacent thickened ends thereof and butt welded thereto to form an intermediate protector collar on said length of pipe, at least part of said sleeve having circumferentially continuous solid wall structure and being at least as great in outside diameter and wall thickness as said tool joints and of greater wall thickness than the main portions of said drill pipe sections.

References Cited

UNITED STATES PATENTS

| 1,848,762 | 3/1932 | Atkinson | 175—325 X |
| 2,234,451 | 3/1941 | Ransome | 175—325 X |
| 2,247,173 | 6/1941 | Huntsinger | 308—4 X |
| 2,751,194 | 6/1956 | Rohrback et al. | 287—125 X |
| 3,080,179 | 3/1963 | Huntsinger | 285—286 X |
| 3,360,846 | 1/1968 | Schellstede et al. | 308—4 X |

DAVID J. WILLIAMOWSKY, Primary Examiner

DAVE W. AROLA, Assistant Examiner

U.S. Cl. X.R.

308—4